(12) United States Patent
Park et al.

(10) Patent No.: US 9,287,035 B2
(45) Date of Patent: Mar. 15, 2016

(54) FLYBACK CONVERTER USING COAXIAL CABLE TRANSFORMER

(71) Applicant: SOONGSIL UNIVERSITY RESEARCH CONSORTIUM TECHNO-PARK, Seoul (KR)

(72) Inventors: Joung Hu Park, Seoul (KR); Do Hyun Kim, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 98 days.

(21) Appl. No.: 14/362,403

(22) PCT Filed: Nov. 15, 2012

(86) PCT No.: PCT/KR2012/009649
§ 371 (c)(1),
(2) Date: Jun. 3, 2014

(87) PCT Pub. No.: WO2013/085160
PCT Pub. Date: Jun. 13, 2013

(65) Prior Publication Data
US 2014/0340938 A1 Nov. 20, 2014

(30) Foreign Application Priority Data
Dec. 9, 2011 (KR) .................. 10-2011-0131940

(51) Int. Cl.
*H01F 27/28* (2006.01)
*H01F 27/29* (2006.01)
*H02M 3/28* (2006.01)
*H02M 3/24* (2006.01)

(52) U.S. Cl.
CPC ............ *H01F 27/2823* (2013.01); *H02M 3/24* (2013.01); *H02M 3/28* (2013.01); *H01F 2027/2833* (2013.01)

(58) Field of Classification Search
CPC ........ H01F 5/04; H01F 27/2847; B23K 11/24
USPC ......................................... 336/192, 195, 223
See application file for complete search history.

(56) References Cited

U.S. PATENT DOCUMENTS 3,005,965 A * 10/1961 Wertanen ................ H01F 17/02
333/24 R
4,814,965 A 3/1989 Petersen
(Continued)

FOREIGN PATENT DOCUMENTS

JP 2004-207386 A 7/2004
KR 10-0965797 B1 6/2010

*Primary Examiner* — Tsz Chan
(74) *Attorney, Agent, or Firm* — Revolution IP, PLLC

(57) ABSTRACT

Disclosed is a flyback converter using a coaxial cable transformer which includes: a flyback driving unit that supplies a primary current; a transformer that is formed by winding a cable, which has a plurality of inner conductors as a primary cable and an outer conductor enclosing the inner conductors as a secondary cable, around a magnetic core and by connecting both ends of the primary cable and that receives the primary current and outputs a secondary current in accordance with the turn ratio of the primary cable and the secondary cable; a rectifying diode that rectifies the secondary current; and an output capacitor that smoothes a voltage through the rectifying diode.

10 Claims, 5 Drawing Sheets

(56) References Cited

U.S. PATENT DOCUMENTS

| | | | | |
|---|---|---|---|---|
| 5,341,280 A | * | 8/1994 | Divan | H01F 38/14 320/109 |
| 6,087,916 A | * | 7/2000 | Kutkut | H01F 27/22 336/195 |
| 6,974,905 B2 | | 12/2005 | Kazama | |
| 7,119,648 B1 | * | 10/2006 | Herbert | H01F 27/027 336/175 |
| 7,573,000 B2 | * | 8/2009 | Blankenship | H05H 1/36 219/121.48 |
| 8,269,592 B1 | * | 9/2012 | McCauley, IV | H01F 27/28 336/175 |

* cited by examiner

FLYBACK CONVERTER USING COAXIAL CABLE TRANSFORMER

CROSS REFERENCE TO PRIOR APPLICATIONS

This application is a National Stage Application of PCT International Patent Application No. PCT/KR2012/009649 filed on Nov. 15, 2012, under 35 U.S.C. §371, which claims priority to Korean Patent Application No. 10-2011-0131940 filed on Dec. 9, 2011, which are all hereby incorporated by reference in their entirety.

TECHNICAL FIELD

The present invention relates to a flyback converter using a coaxial cable transformer, and more particularly to a flyback converter using a transformer that implements various turn ratios.

BACKGROUND ART

In most of applications of switch power, there is a need of electric insulation between the input and the output to protect a user from a danger of an accident due to high voltage or leakage current. A high-frequency transformer is used for the insulation and this converter is called an 'isolated DC-DC converter'. The transformer adjusts the magnitude of the output voltage, using the ratio of the first and second cables, other than insulating. Typical isolated converters are a flyback converter, a forward converter, a push-pull converter, a half-bridge converter, and a full-bridge converter. The flyback converter and the forward converter are generally used for small power circuits under hundreds of watts.

FIG. 1 is a circuit diagram of a flyback converter of the related art. Referring to FIG. 1, the flyback converter includes a flyback driving unit 100 that supplies a primary current by turning on/off an internal power switch, a transformer 200 that receives the primary current and outputs a secondary current in accordance with the turn ratio of a primary cable and a secondary cable, a rectifying diode 300 that rectifies the secondary current, an output capacitor 400 that smoothes voltage through the rectifying diode 300, and an output resistor 500 that is connected with a load.

The flyback converter is the same in basic operation as a buck-boost converter of non-isolated converters. When power is supplied to the switch in the flyback driving unit, a current flows to the primary cable of the transformer and an input voltage is induced in the cable. A voltage with a polarity opposite to that of the primary cable is induced in the secondary cable due to the direction of the black spot, such that the diode is reversely biased and the current is stopped, and thus energy is accumulated only in the magnetizing inductance of the primary cable. When the switch is disconnected, a voltage having a polarity opposite to that of the previous state is induced in the secondary cable and power is supplied to the diode, such that the energy accumulated in the magnetizing inductance of the transformer is discharged to the output part.

In this configuration, the transformer is the most essential part that changes the magnitude of an AC voltage, using electromagnetic induction. When a coil is wound at both sides of a metal core and the current from one power supply changes with the lapse of time, the magnitude of the magnetic field changes accordingly. The magnetic field is transmitted through the metal core, so the magnitude of the magnetic field passing through the coil at the opposite side also changes with the lapse of time. At the opposite coil, an induced electromotive force is generated by electromagnetic induction and an induced current flows, such that an AC current is induced. The transformer can change the magnitude of a voltage in accordance with turn ratio of the coils. An important performance index in power transformers is a coupling coefficient. That is, the loss due to leakage inductance in the existing transformers depends on the coupling coefficient.

The existing transformers generally use cables formed in a sandwich type. The gap between the primary cable and the secondary cable should be small to achieve a transformer having excellent coupling, but when cables are formed in a sandwich type, there is a limit in reducing the gap between the cables. In the existing transformers using a common coaxial cable to solve this problem, not a solenoid cable, but a loop cable is formed around the center space of a toroidal core, because the cables are thick. This configuration imposes a burden on the prices, so there is a defect that it is generally used only for large capacity and the coupling coefficient is not high.

A transformer using a coaxial cable which has a small gap between the primary cable and the secondary cable is described in detail hereafter with reference to FIGS. 2 and 3.

FIGS. 2 and 3 are views illustrating the structure of a transformer using a coaxial cable according to the related art.

As illustrated in FIGS. 2 and 3, the transformer of the related art has a structure formed by winding an inner conductor and an outer conductor on a bobbin 30 as a primary cable 10 and a secondary cable 20 (the opposite is possible), using a coaxial cable, and then enclosing it with a magnetic core 40. The transformer using a coaxial cable of the related art has a problem in that it is difficult to be used for high-voltage power devices, because the turn ratio of the primary cable 10 and the secondary cable 20 is necessarily 1 to 1. Accordingly, several pieces of one-to-one cables are connected in series between the inner conductors and in parallel between the outer conductors in the transformers of the related art in order to achieve various turn ratios, but it causes the efficiency to reduce.

The background of the present invention has been disclosed in U.S. Pat. No. 4,814,965 (Mar. 21, 1989).

DISCLOSURE

Technical Problem

The present invention has been made in an effort to provide a flyback converter using a coaxial cable transformer that constitutes a flyback converter substantially without leakage inductance because various turn ratios of a transformer are achieved by twisting several pieces of thin enamel wires with the coating insulated in a coaxial cable to make an inner conductor and by connecting it to the end in series.

Technical Solution

A flyback converter using a coaxial cable transformer according to an embodiment of the present invention includes: a flyback driving unit that supplies a primary current; a transformer that is formed by winding a cable, which has a plurality of inner conductors as a primary cable and an outer conductor enclosing the inner conductors as a secondary cable, around a magnetic core and by connecting both ends of the primary cable in series and that receives the primary current and outputs a secondary current in accordance with the turn ratio of the primary cable and the secondary cable; a rectifying diode that rectifies the secondary current; and an output capacitor that smoothes a voltage through the rectifying diode.

A flyback converter using a coaxial cable transformer according to another embodiment of the present invention includes: a flyback driving unit that supplies a primary current; a transformer that is formed by winding a cable, which has a plurality of inner conductors as a secondary cable and an outer conductor enclosing the inner conductors as a primary cable, around a magnetic core and by connecting both ends of the secondary cable in series and that receives the primary current and outputs a secondary current in accordance with the turn ratio of the primary cable and the secondary cable; a rectifying diode that rectifies the secondary current; and an output capacitor that smoothes a voltage through the rectifying diode.

The cable may be a multi-core coaxial cable of which the inner conductor is formed by twisting several pieces of thin enamel wires with an insulating coating and connecting the enamel wires with the end of the primary cable or the secondary cable in series.

The cable may be a coaxial cable.

The number of the inner conductors to the outer conductor may be determined in consideration of the turn ratio of the primary cable and the secondary cable.

The cable may be formed in a solenoid winding type that forms the inner conductor by twisting several pieces of thin enamel wires with an insulating coating and connecting the enamel wires with the end of the primary cable or the secondary cable in series, along a path formed around the internal magnetic field of a magnetic core.

When a toroidal core that is a ring-shaped magnetic core is used, the cable may be formed in a toroidal winding type that forms the inner conductor by twisting several pieces of thin enamel wires with an insulating coating and connecting the enamel wires with the end of the primary cable or the secondary cable in series, along a path formed around the center space of the toroidal core.

A flyback converter using a coaxial cable transformer according to another embodiment of the present invention includes: a flyback driving unit that supplies a primary current; a transformer that is formed by winding a cable, which has inner conductors formed by twisting a plurality of thin enamel wires with an insulating coating as a primary cable and a coated outer conductor enclosing the inner conductors as a secondary cable, around a magnetic core and by connecting the thin enamel wires at both ends of the primary cable in series and that receives the primary current and outputs a secondary current in accordance with the turn ratio of the primary cable and the secondary cable; a rectifying diode that rectifies the secondary current; and an output capacitor that smoothes a voltage through the rectifying diode.

The cable may be formed by a solenoid winding type that winds a cable along a path formed around the internal magnetic field of the magnetic core.

When the magnetic core is a toroidal core that is a ring-shaped magnetic core, the cable may be formed by a toroidal winding type that winds a cable along a path formed through the center space of the toroidal core.

The cable may be formed by being wound around one or a pair of magnetic core.

Advantageous Effects

Accordingly, it is possible to improve the power efficiency by improving the coupling coefficient to minimize leakage inductance by manufacturing the coaxial cable transformer included in the flyback converter, using a multi-core coaxial cable.

Further, when the coaxial cable transformer included in the flyback converter is manufactured, using a multi-core coaxial cable, it is possible to manufacture a transformer for converting small capacity of power, using a small amount of magnetic core in a solenoid winding type, such that it is possible to reduce the cost and size.

Further, when the coaxial cable transformer that is included in the flyback converter is manufactured, a thin coaxial cable having various turn ratios of a transformer is achieved by twisting and connecting several pieces of enamel wires in series, and a solenoid winding type that can wind the coaxial cable around a single magnetic core can be used, so it is possible to reduce the cost and size of a transformer. Further, it is possible to achieve various turn ratios of a transformer by making an inner conductor by twisting several pieces of thin enamel wires with an insulating coating and by connecting the ends in series.

BEST MODE

Hereinafter, embodiments of the present invention are described with reference to the accompanying drawings. The terms used herein are terms selected in consideration of the functions in the embodiments and their meanings may depend on the intention of users and workers or precedents. Therefore, the meanings of the terms used in the following embodiments follow the definitions, if defined in detail herein, or should be construed as the meanings that those skilled in the art know, if not defined in detail.

Figure 1:
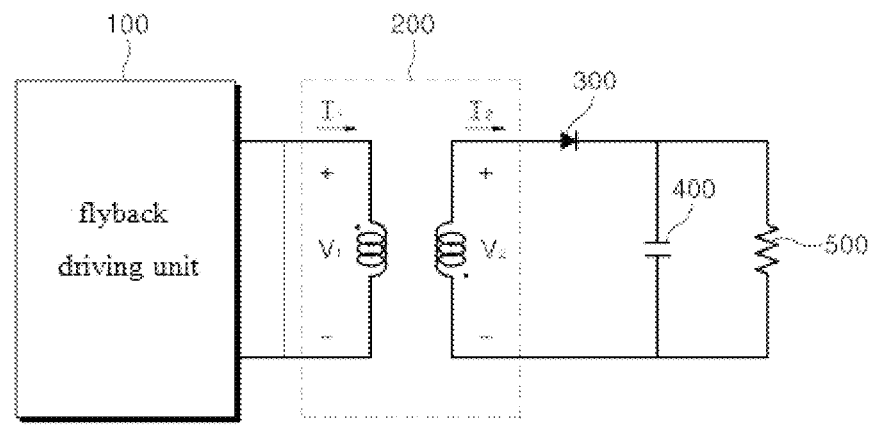
FIG. 1 is a circuit diagram of a flyback converter of the related art.
Figure 2:
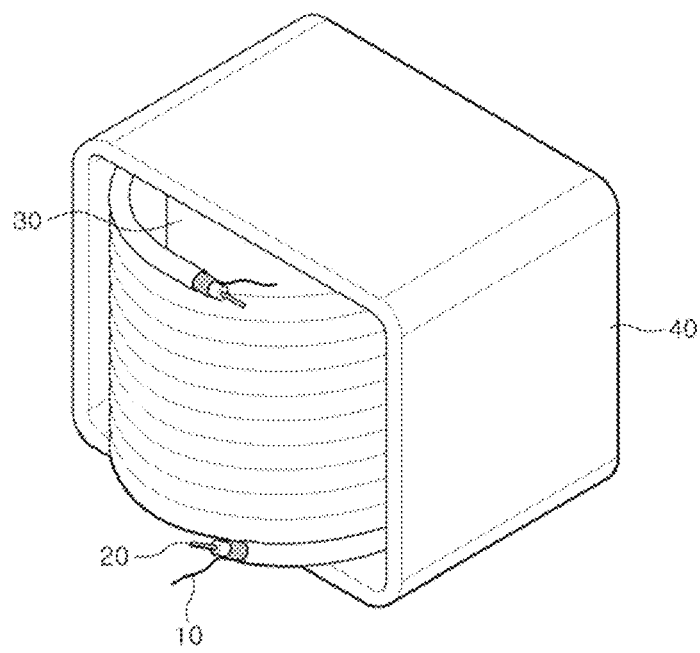
FIGS. 2 and 3 are views illustrating the structure of a transformer using a coaxial cable according to the related art.
Figure 3:
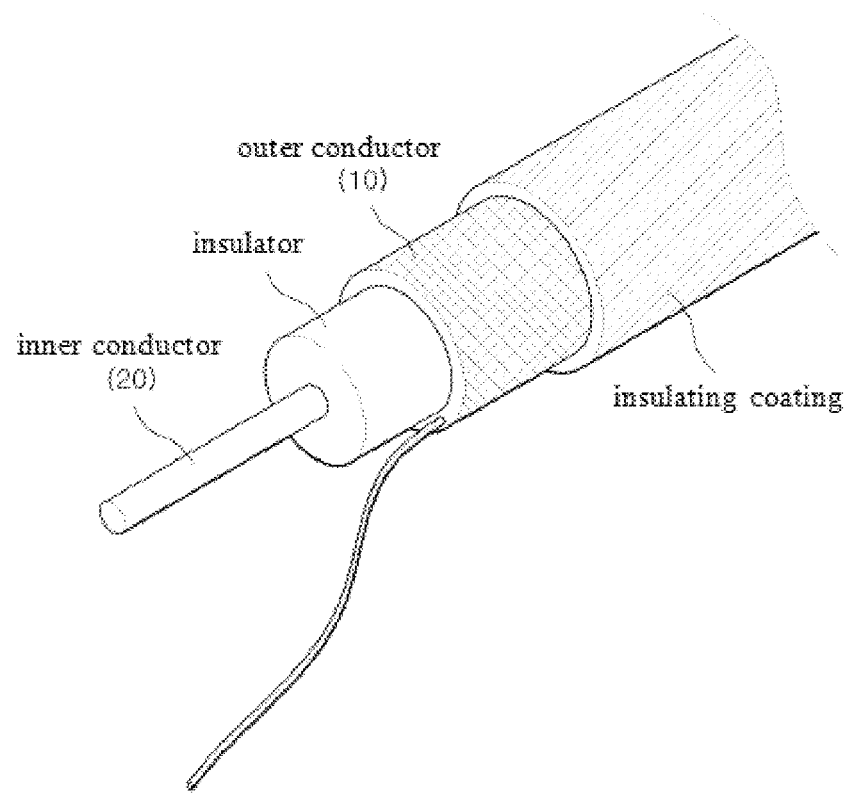
Figure 4:
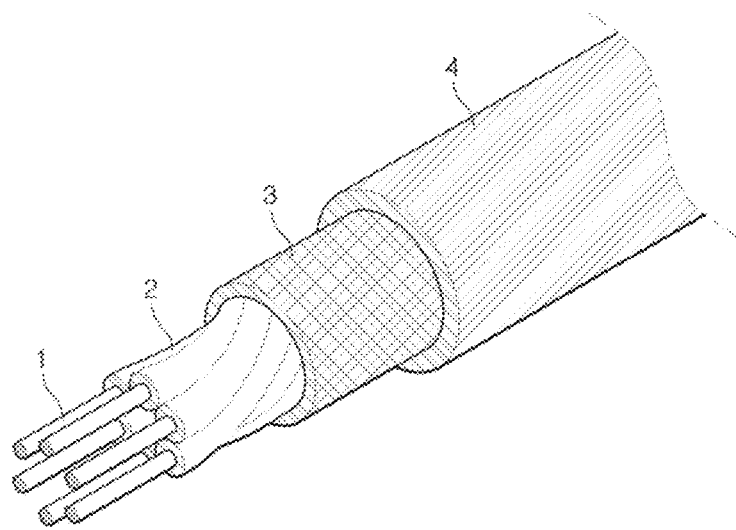
FIG. 4 is a view illustrating a primary cable and a secondary cable of a coaxial cable that is used for a coaxial cable transformer included in a flyback converter according to an embodiment of the present invention.
Figure 5:
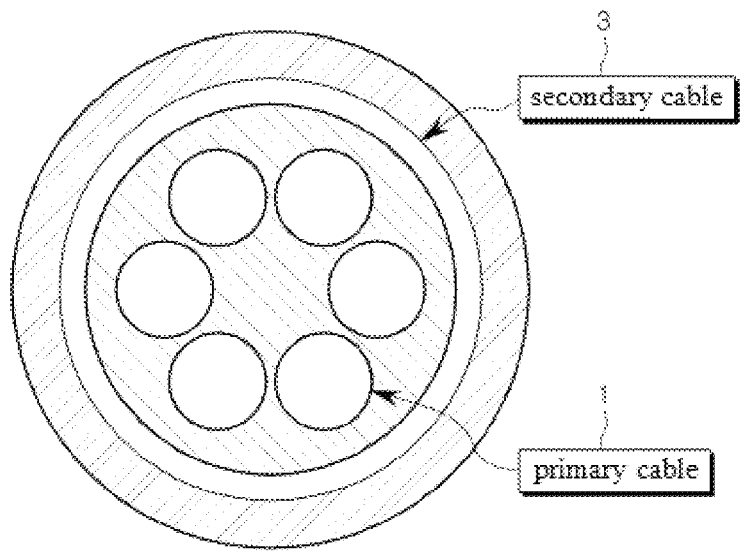
FIG. 5 is a view illustrating the cross-section illustrating the ends of the primary cable and the secondary cable of a coaxial cable that is used for a coaxial cable transformer included in a flyback converter according to an embodiment of the present invention.

As illustrated in FIGS. 4 and 5, a coaxial cable transformer included in a flyback converter of the present invention is manufactured, using a coaxial cable. The coaxial cable has a plurality of inner conductors as primary cables 1 and an outer conductor with a coating 4 enclosing the inner conductors as a secondary cable 3.

The gap between the primary cables 1 and the secondary cable 3 should be small to achieve a transformer with excellent coupling. In the present invention, the coupling coefficient is increased by using the primary cables 1 and the secondary cable 3, as the inner conductors and the outer conductor of a coaxial cable, respectively.

In particular, the coupling coefficient is made close to 100% by using the coaxial cable including the inner conductors formed by twisting several pieces of thin enamel wires 1 and 2 and the external conductor enclosed by the coating 4 made of an inductor.

The inner conductors are formed by twisting several pieces of thin enamel wires 1 and 2 with the cover insulated by the enamel coating 2 and the ends of the inner conductors (primary cables 1) are connected in series, such that various turn ratios (the winding ratio of the primary wires 1 and the secondary wire 3) of the transformer can be achieved.

According to this configuration, the magnetic flux due to the current in the primary cables 1 (inner conductors) wound on the magnetic core is offset by 100% with the secondary wire 3 (outer conductor) due to the structure of the coaxial cable, such that the primary side and the secondary side are completely combined. Therefore, the frequency characteristic at the primary side and the secondary side of the transformer becomes excellent, and particularly, when it is used as a pulse-output transformer, waveforms are outputted without a distortion.

Although the inner conductors and the outer conductor are defined as the primary cables 1 and the second cable 3 in the present invention, they may be defined opposite to it, depending on the set turn ratio.

The ends of the enamel wires 1 and 2 are connected in series so that various turn ratios (1:N) of the coaxial cable transformer can be achieved in the flyback converter, and since the magnetic core can be wound in a solenoid winding type because the thickness is small. The solenoid winding type means the type of winding a cable along a path formed around the internal magnetic field of a magnetic core.

Further, when a toroidal core is used for the coaxial cable transformer included in the flyback converter of the present invention, it is possible to wind a magnetic core in the toroidal winding type of winding a cable through the space at the center of the toroidal core.

In the existing transformers, since the thickness of cables is large, the cables are wound not in the solenoid winding type, but the loop winding type, through the space at the center of a toroidal core that is a ring-shaped magnetic core. Transformers having this structure have been generally used only for large capacity due to the high manufacturing cost, and the coupling coefficient is not high because the inner conductors are not twisted.

In the coaxial cable transformer having the structure, the ends of the inner conductors formed by twisting several pieces of thin enamel wires 1 and 2 are connected in series and they are wound around one or a pair of magnetic core in the solenoid winding type or the toroidal winding type.

It is required to firmly wind the cables in the coaxial cable transformer in order to minimize the influence by leakage inductance. Since the enamel wires 1 and 2 are thin conductive wires, they can be wound more densely than the existing coaxial cables, so coupling is firm and thus the influence by leakage inductance can be minimized.

Figure 6:
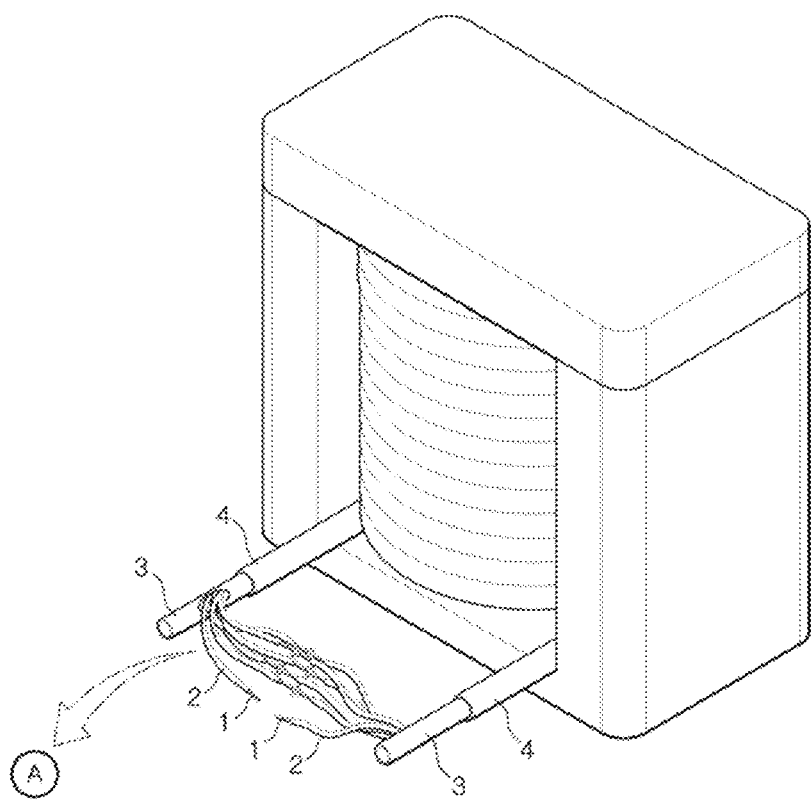
FIG. 6 is a view illustrating the structure of a coaxial cable transformer included in a flyback converter according to an embodiment of the present invention.
Figure 7:
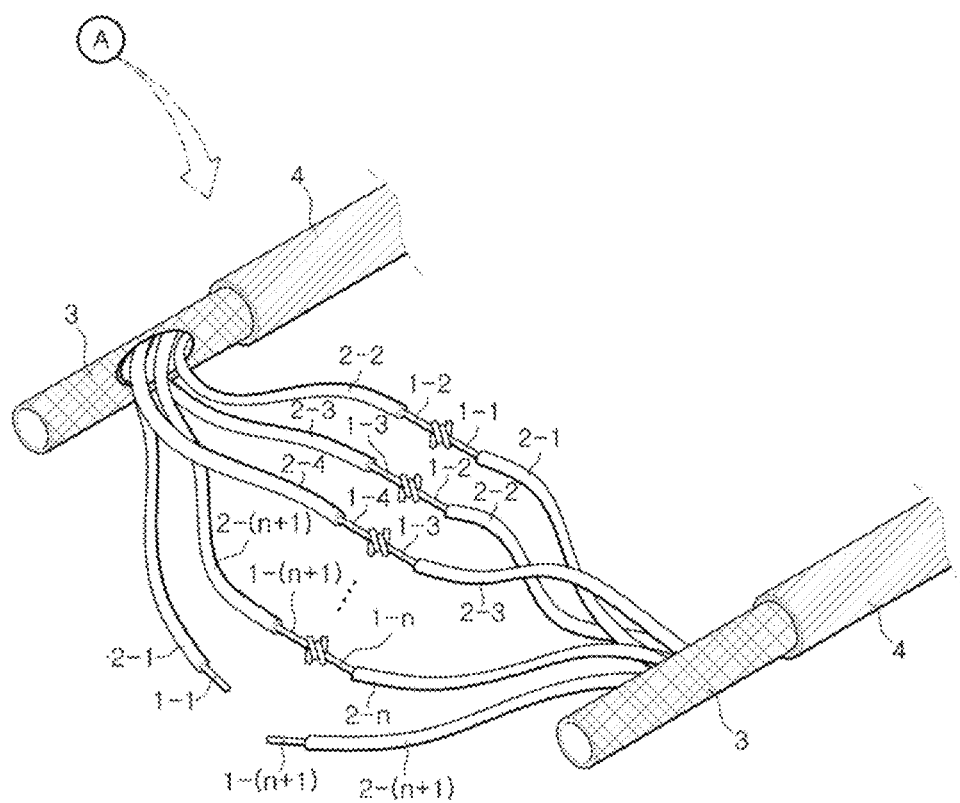
FIG. 7 is a view illustrating the structure of the end of the inner conductor of the coaxial cable transformer included in a flyback converter according to an embodiment of the present invention.

As illustrated in FIGS. 6 and 7, since the ends of the inner conductors formed by twisting several pieces of thin enamel wires 1 and 2 are connected in series in the coaxial cable transformer (that is, 1-1 of 2-1 and 1-2 of 2-2), the coupling coefficient is large and various turn ratio can be achieved.

In the flyback converter of the present invention, the coupling coefficient is improved by using a transformer using a multi-core coaxial cable and the power efficiency is improved by minimizing leakage inductance.

The coaxial cable transformer of the present invention is achieved by a thin coaxial cable that provides various turn ratios for a transformer by twisting and connecting several pieces of enamel wires 1 and 2 in series, and the cost and size can be reduced by the solenoid winding type that can wind the coaxial cable on a single magnetic core.

Although the coaxial cable of the present invention is composed of two conductors of an inner conductor and an outer conductor, the present invention is not limited thereto and a coaxial cable composed of three or more conductors can be achieved.

For example, when it is a three-conductor coaxial cable having one outer conductor and two inner conductors and they are appropriately connected with one of the conductors as any one of a primary cable and a secondary cable and the other conductors as the other cables, a high-voltage/high-current or multi-output power can be achieved.

Although the present invention has been described on the basis of the embodiments described with reference to the drawings, but it is not limited thereto. Therefore, the present invention should be construed on the basis of claims intended for including modifications that can be achieved apparently from the embodiments.

The invention claimed is:

1. A flyback converter using a coaxial cable transformer, comprising:
   a flyback driving unit that supplies a primary current;
   a transformer that is formed by winding a cable, which has a plurality of inner conductors as a primary cable and an outer conductor enclosing the inner conductors as a secondary cable, around a magnetic core and by connecting both ends of the primary cable in series and that receives the primary current and outputs a secondary current in accordance with the turn ratio of the primary cable and the secondary cable;
   a rectifying diode that rectifies the secondary current; and
   an output capacitor that smoothes a voltage through the rectifying diode.

2. The flyback converter of claim 1, wherein the cable is a multi-core coaxial cable of which the inner conductor is formed by twisting several pieces of thin enamel wires with an insulating coating and connecting the enamel wires with the end of the primary cable or the secondary cable in series.

3. The flyback converter of claim 1, wherein the cable is a coaxial cable.

4. The flyback converter of claim 1, wherein the number of the inner conductor to the outer conductor is determined in consideration of the turn ratio of the primary cable and the secondary cable.

5. The flyback converter of claim 1, wherein the cable is formed in a solenoid winding type that forms the inner conductor by twisting several pieces of thin enamel wires with an insulating coating and connecting the enamel wires with the end of the primary cable or the secondary cable in series, along a path formed around the internal magnetic field of a magnetic core.

6. The flyback converter of claim 1, wherein when a toroidal core that is a ring-shaped magnetic core is used, the cable is formed in a toroidal winding type that forms the inner conductor by twisting several pieces of thin enamel wires with an insulating coating and connecting the enamel wires with the end of the primary cable or the secondary cable in series, along a path formed around the center space of the toroidal core.

7. A flyback converter using a coaxial cable transformer, comprising:
   a flyback driving unit that supplies a primary current;
   a transformer that is formed by winding a cable, which has inner conductors formed by twisting a plurality of thin enamel wires with an insulating coating as a primary cable and a coated outer conductor enclosing the inner conductors as a secondary cable, around a magnetic core and by connecting the enamel wires at both ends of the primary cable in series and that receives the primary current and outputs a secondary current in accordance with the turn ratio of the primary cable and the secondary cable;

a rectifying diode that rectifies the secondary current; and an output capacitor that smoothes a voltage through the rectifying diode.

8. The flyback converter of claim 7, wherein the cable is formed by a solenoid winding type that winds a cable along a path formed around the internal magnetic field of the magnetic core.

9. The flyback converter of claim 7, wherein when the magnetic core is a toroidal core that is a ring-shaped magnetic core, the cable is formed by a toroidal winding type that winds a cable along a path formed through the center space of the toroidal core.

10. The flyback converter of claim 7, wherein the cable is formed by being wound around one or a pair of magnetic core.

* * * * *